Feb. 18, 1936. F. A. PESCHL 2,031,126
SPHERICAL MACHINE
Filed July 17, 1934 6 Sheets-Sheet 5
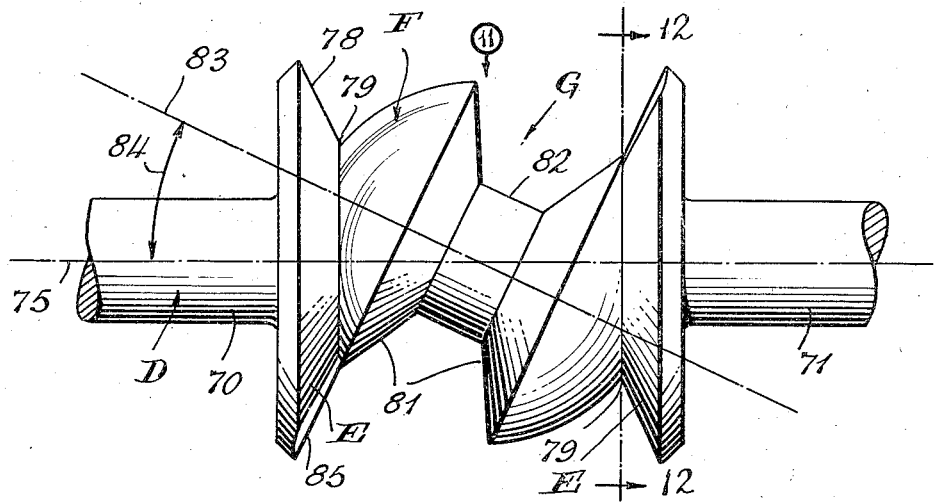
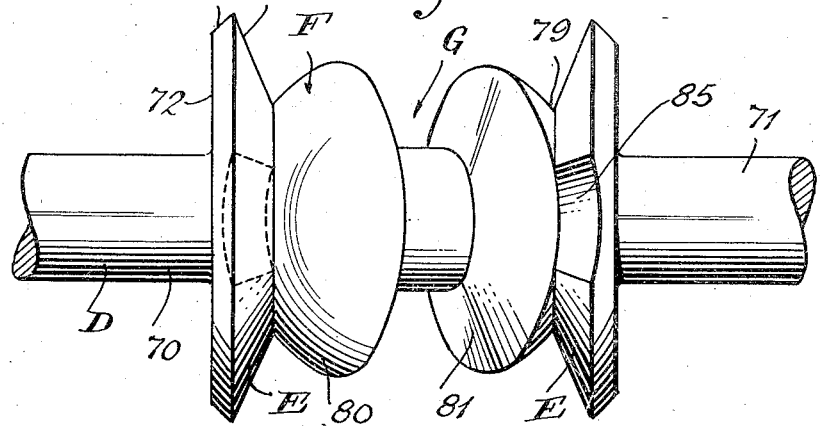
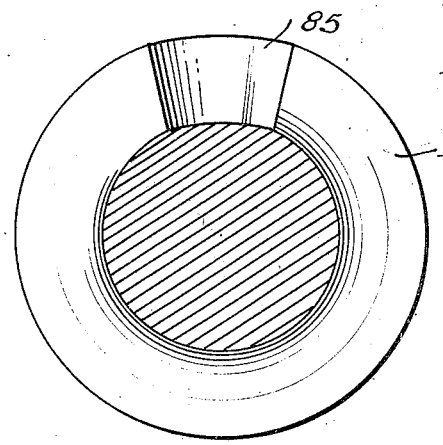
INVENTOR
FRANK A. PESCHL
BY
Richards & Geier
ATTORNEYS

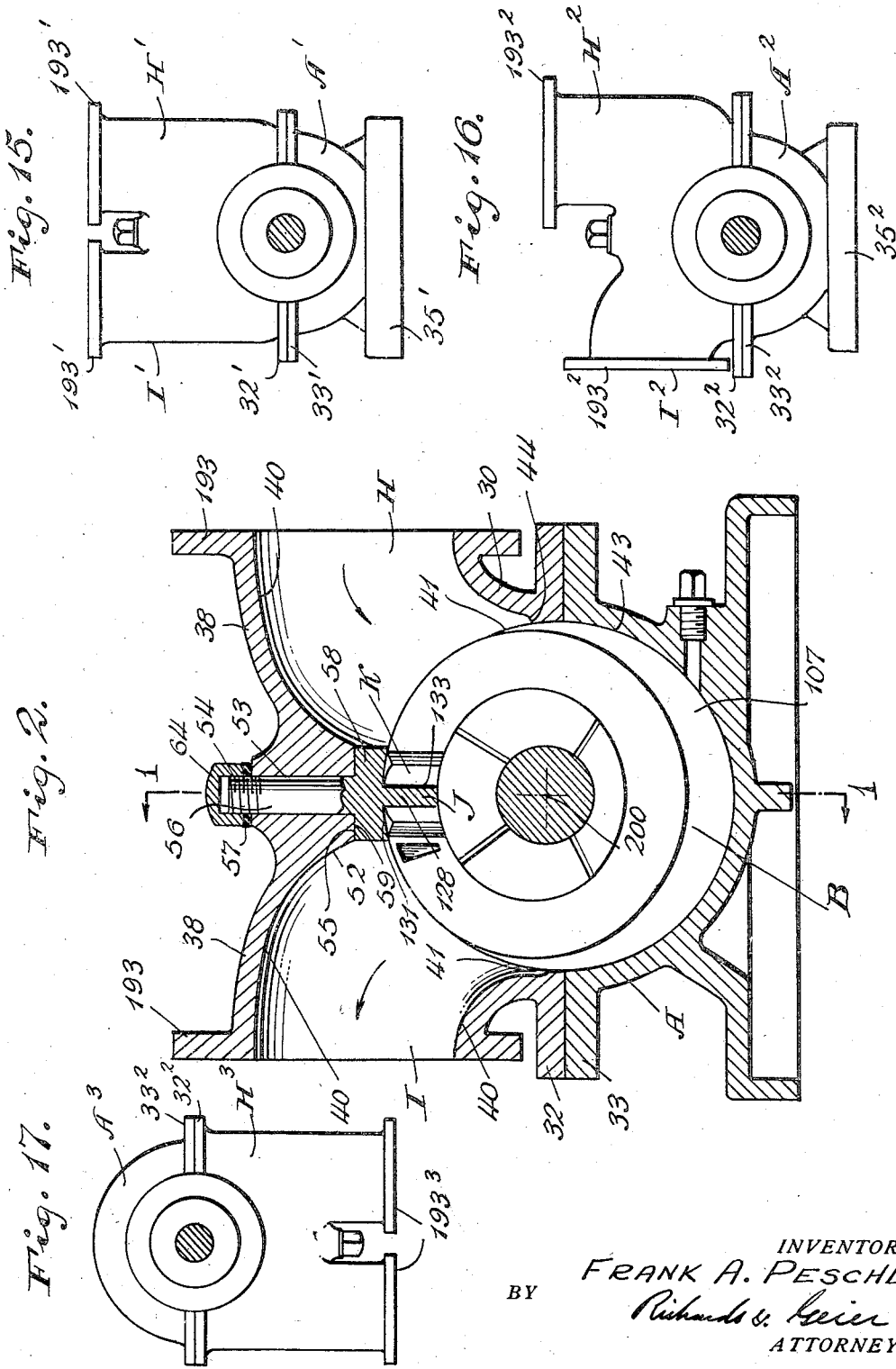

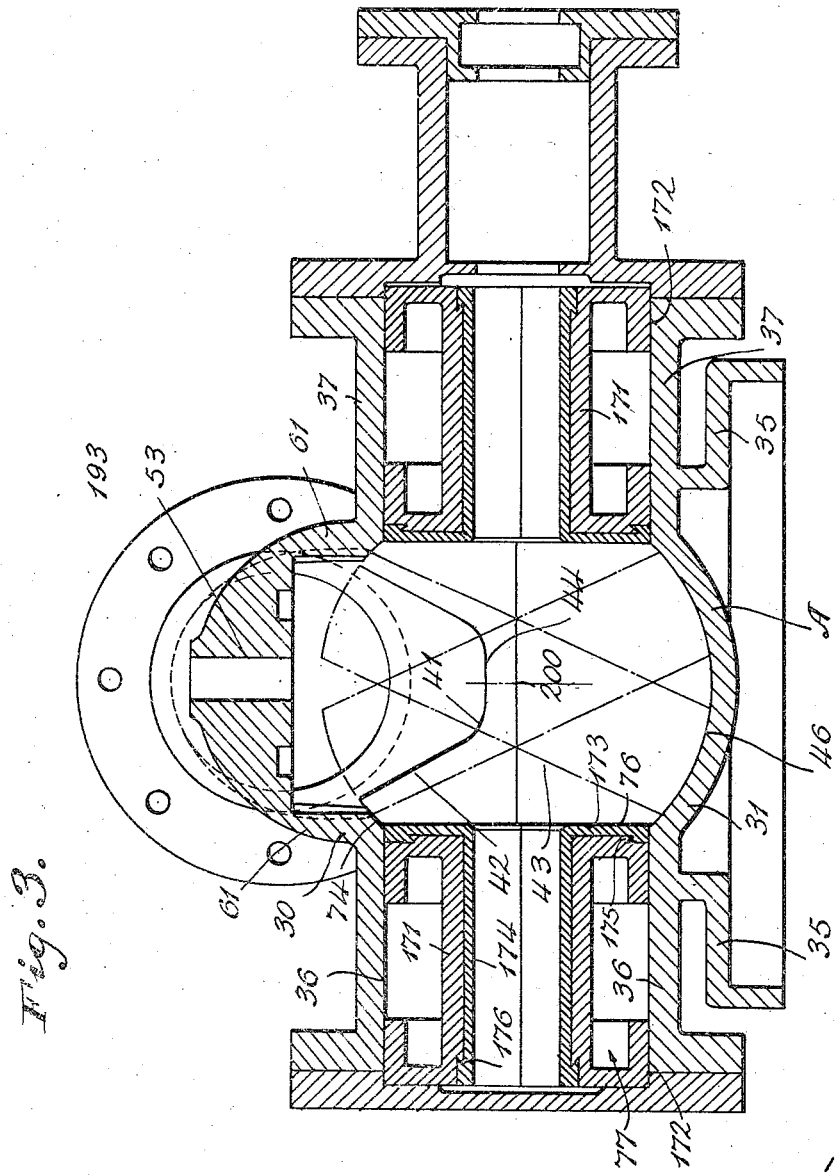

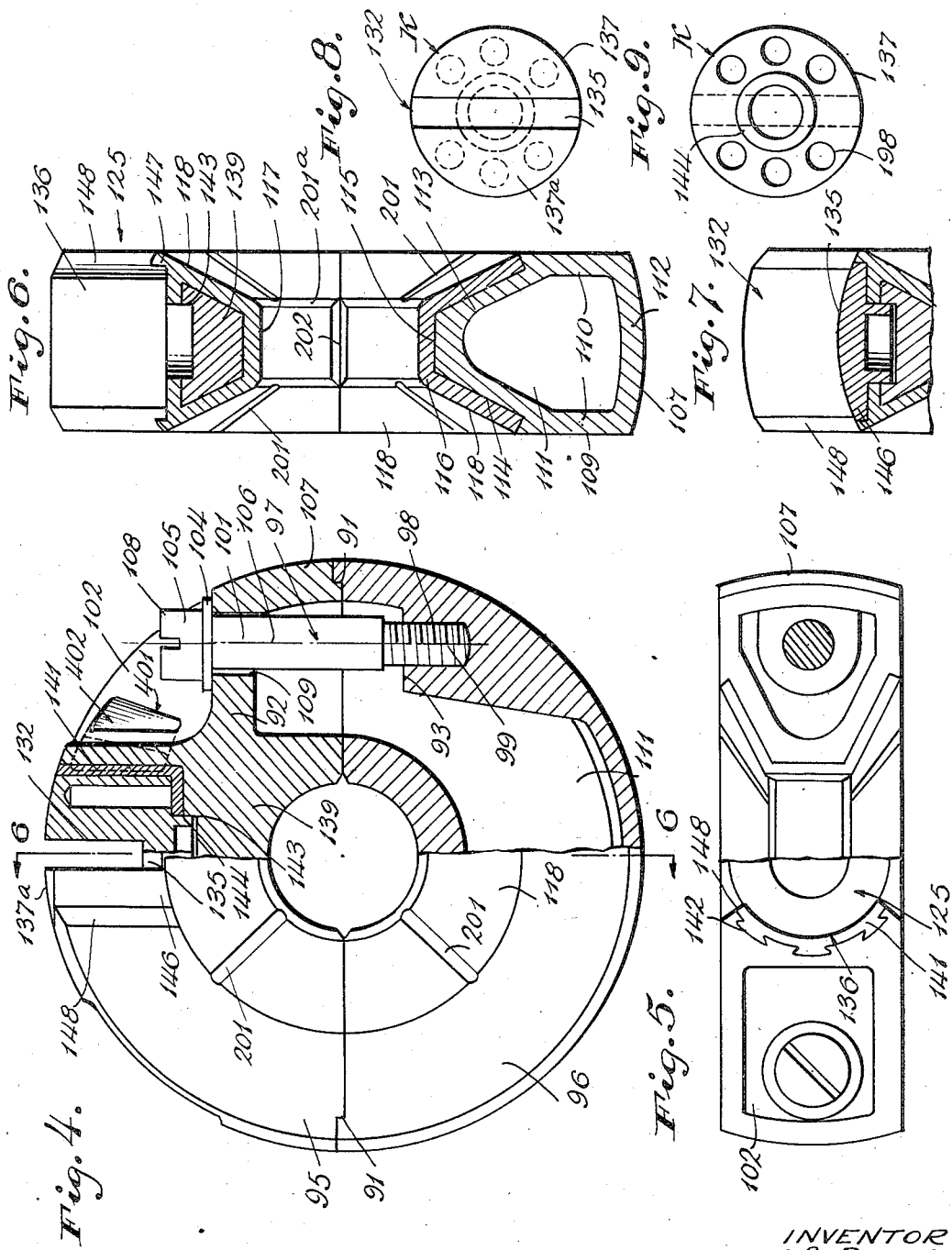

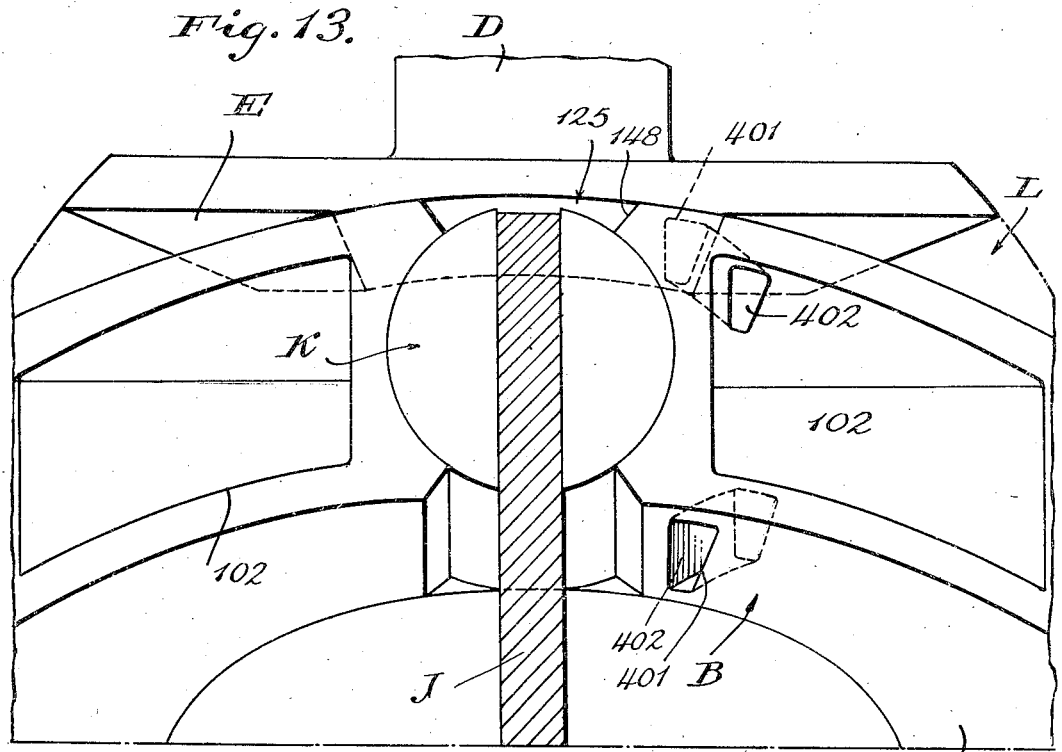
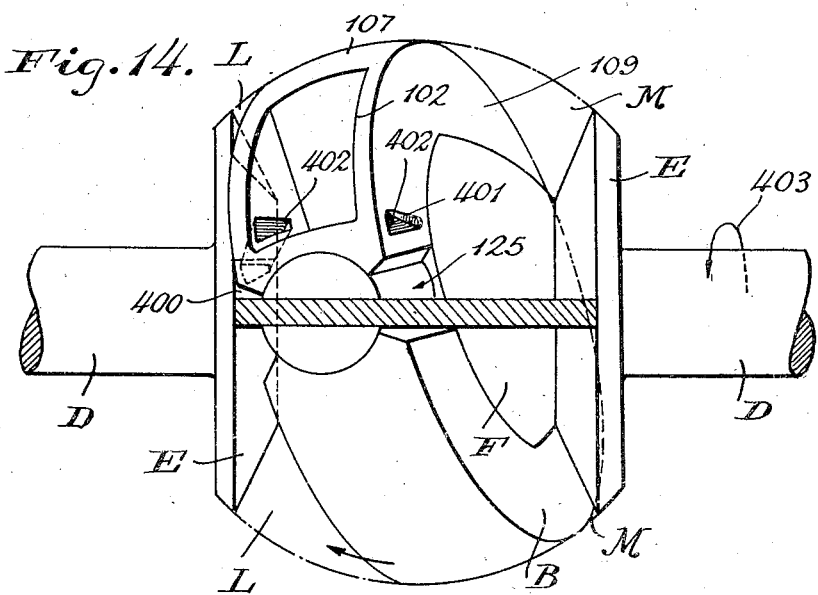

Patented Feb. 18, 1936

2,031,126

UNITED STATES PATENT OFFICE 2,031,126

SPHERICAL MACHINE

Frank A. Peschl, Jackson Heights, N. Y., assignor to Erospha, Inc., New York, N. Y., a corporation of New York Application July 17, 1934, Serial No. 735,553

11 Claims. (Cl. 103—133)

The present invention relates to fluid actuators and particularly to spherical engines adapted for pumping liquids, creating a vacuum, compressing vapors and gases and so forth.

Although the present invention will be particularly described in its application to liquid pumps, it is to be understood that it may also be employed in connection with other spherical machines or apparatus, where a fluid or a liquid is passed into a casing to cause a shaft or a mechanism to be actuated, the flowing liquid or fluid being the source of energy.

The present invention, although not restricted thereto, is particularly concerned with a novel type of fluid actuator consisting of:

(1) A casing, the interior fluid receiving chamber of which may take the form of a spherical section or segment, provided with a central spherical surface and with flat or more preferably conical side walls which may be fixed or more preferably rotatable in respect to said peripheral surface;

(2) An oscillating impeller or piston, the oscillating movement of which takes place laterally between said side walls and across said peripheral wall about a fixed center point;

(3) A driving member which has an oblique eccentric drive bearing for said impeller, positioning said impeller obliquely in said interior chamber so that it oppositely approaches and diverges from said side walls, undergoing a sinuous movement, said eccentric bearing causing the impeller to undergo said oscillating movement within the interior chamber whereby fluid is actuated or propelled from the inlet to the outlet;

(4) Inlet and outlet connections for the fluid which may enter through the side walls and/or through the peripheral walls, but preferably through the latter alone;

(5) A separating means or wall extending transversely across one side of said interior chamber between said inlet and outlet ports, which may be fixed in the casing or pivotally mounted in respect thereto;

(6) Guide means which may be located apart from the separating wall, but which are preferably combined with said separating wall permitting the impeller to partake of said relative pivotal and sliding oscillating movement without rotation with the eccentric bearing.

The annular impelling and/or propelling actuating or actuated side surfaces of the piston may be transverse to the axis of the eccentric bearing and parallel to each other in the preferred embodiment, or they may consist of frustoconical surfaces, the axes of which may coincide with each other and with the axes of the oblique eccentric driving bearing, or be obliquely set to each other and to the axis of the oblique bearing.

The periphery of the impeller is spherical so as to conform to the periphery of the interior chamber and its oblique position within the interior chamber will cause said interior chamber to be divided into one or more annular wedge-shaped compartments which will be separated from each other by the impeller.

The oscillating movement of the impeller will continuously rotate these compartments within the interior chamber of the casing from the inlet to the outlet and cause them to pass through the separating means between the inlet and outlet ports. As these compartments pass through the separating member, they will be divided thereby and such divisions will successively decrease in volume in communication with the outlet port, compressing and/or discharging fluid therethrough, and at the same time they will increase in volume in communication with the inlet port receiving or drawing in fluid therethrough.

It is an object of the present invention to so coordinate the inlet and outlet port connections with the casing and with the interior chamber of the casing that the flow of fluid into said chamber and out of said chamber will take place with minimum losses, without substantial obstruction to the flow of fluid at the inlet and outlet port connections, without the formation of vacuum spaces on the inlet side, without undesirable compression on the outlet side, and without the formation of an excessive amount of eddies or whirls therein, so that the compartments will be substantially immediately filled through the inlet and/or substantially immediately discharged through the outlet, as their subdivisions change in volume in passing through the separating member.

Another object is to so coordinate the impeller and interior chamber of the casing that a most efficient seal will be formed between the peripheral and side surfaces of the impeller and the corresponding conforming surfaces of the interior chamber of the casing, without utilizing critical dimensions and very close fits as would tend to cause jamming or cocking of the impeller with excessive friction and possible stoppage and injury to the apparatus during operation of the casing.

Another object is to provide an impeller construction which will assure substantially uniform non-pulsating reception of fluid through the inlet port connection and substantially uniform non-pulsating discharge of fluid through the outlet port connection and will assure that the last portions of the liquid will be expelled readily through said outlet port connection without knocking.

In the preferred form of the invention to provide a most satisfactory sealing or packing between the side and peripheral surfaces of the impeller and the corresponding surfaces of the internal chamber, it has been found most desirable to prevent contact between said corresponding surfaces of the impeller and the interior chamber, and to position the impeller obliquely within the chamber in such manner by its oblique eccentric bearing, that a spacing of several thousandths of an inch will always be provided between such surfaces.

This surface or space packing or sealing is most satisfactorily accomplished by having the propelling or impelling surface of the piston and the side wall of the interior chamber conform to each other over a substantial area, with the side wall of the interior chamber in the preferred form being provided with a recess which receives and has the same contour as a portion of the side of the impeller without contacting therewith. In this preferred form of surface or space packing between the impeller and interior chamber, the side walls of the interior chamber are preferably caused to rotate with the central oblique eccentric bearing so that the side surfaces of the impeller will always obliquely approach and depart from the same portion of the side wall.

This piston or impeller is preferably provided with a transverse slot to receive the separating wall or member and this slot is most desirably provided with a socket to receive a slotted guide, the slot of which receives said separating wall and which is designed to reciprocate backwardly and forwardly along said separating wall with the oscillating movement of the piston or impeller.

To permit the impeller or piston to oscillate in respect to the wall about said guide, the transverse slot should desirably diverge outwardly on each side of said socket or guide member, forming a space in which the liquid or fluid may be compressed and/or in which a vacuum may be formed.

When the space packing between the side of the piston and the rotating side wall passes across the wall there is a relatively rapid change of volume in this space at the end of the transverse slot and it is particularly desirable to provide additional outlet flow area for this space, particularly on the compression side of the separating wall.

To accomplish this the preferred form of the invention may also include suitable recesses or grooves in the side wall of the piston to assure that such compression and/or vacuum will be immediately relieved to assure better operation of the pump.

In the preferred structure, the piston or impeller is provided with a recess in its peripheral spherical surface which communicates by means of suitable auxiliary ports, which ports are valved at desired periods by the space or surface seal between the side of the piston and the rotating side walls of the chamber.

These auxiliary ports assure that any liquid or fluid trapped in the spaces or adjacent to the ends of the transverse slot in the impeller will find ready exit through the outlet port in the recess in the impeller.

During operation the axis of the impeller, the axis of the shaft and the central axis of the casing should all intersect at a common center point. With the rotating side walls however in the preferred embodiment wear takes place between said side walls and adjacent bearing surfaces of the casing which might tend to prevent said axes intersecting at a common point.

To assure such coincidence even though wear takes place it has been found satisfactory to provide adjustable thrust bearings for said side walls, which may be readily adjusted from the sides of the casing through the bearings of the main driving shaft.

The center oblique eccentric bearing preferably consists of a central cylindrical member and side face members, which may inwardly converge and approach each other or be transverse to the eccentric or to the axis of said cylindrical portion.

The above and other objects will appear more clearly from the following detailed description, when taken in connection with the accompanying drawings which illustrate a preferred embodiment of the inventive idea.

In the drawings:

Figure 2 is a transverse sectional view of the assembly taken upon the line 2—2 of Fig. 1.

Figure 3 is a longitudinal sectional view similar to Fig. 1, but with the impeller, separating wall, guide and shaft removed from the casing.

Figure 1:
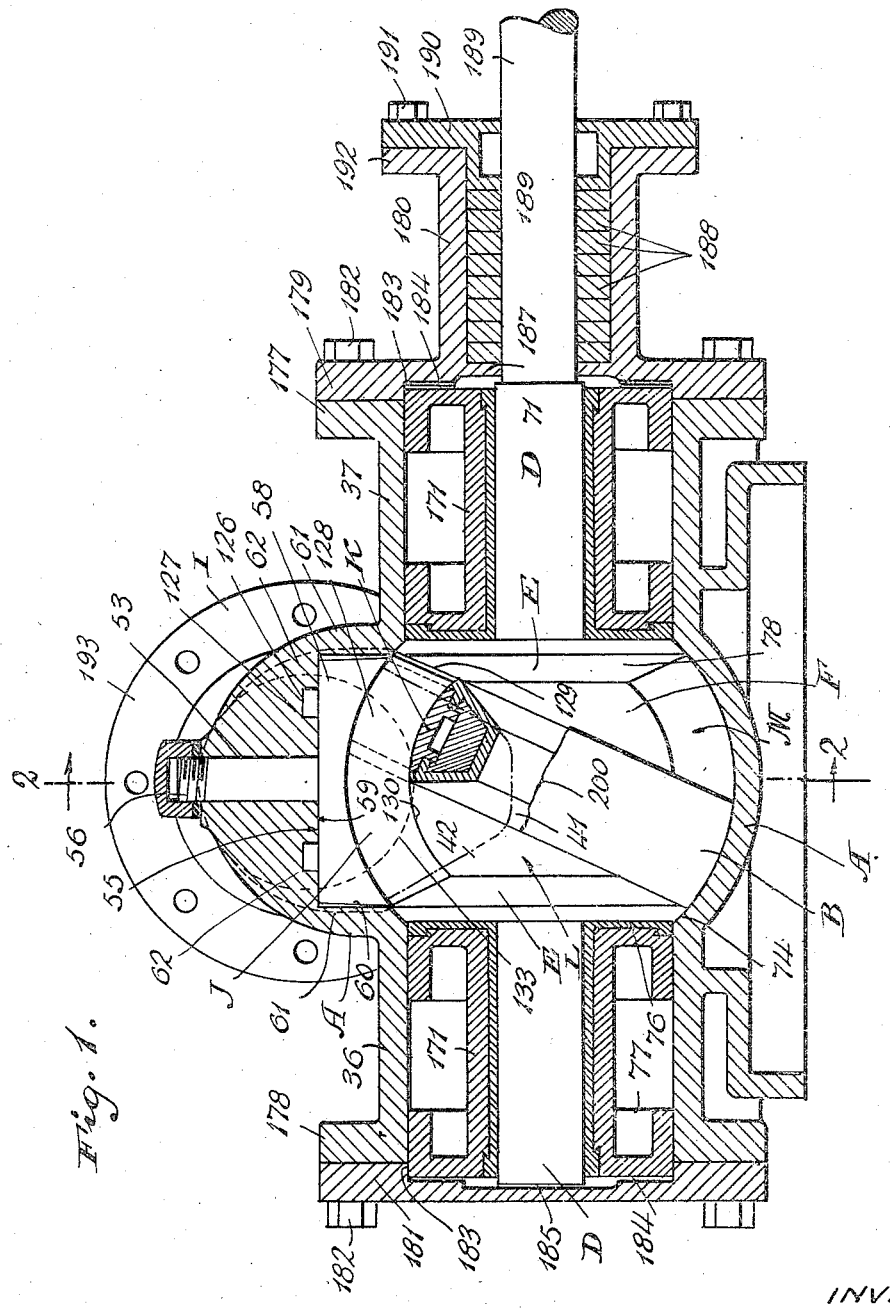
Figure 1 is a longitudinal sectional view of the assembled spherical machine, taken upon the line 1—1 of Fig. 2.

Figures 4, 5 and 6, are views of the impeller or piston removed from the assembly upon an enlarged scale, Fig. 4 being a side view in half section with the guide shown in position, Fig. 5 bing a top view in fragmentary half section upon the line 5—5 of Fig. 4, and Fig. 6 being a side sectional view taken upon the line 6—6 of Fig. 4.

Figures 7, 8 and 9 show the slotted cylindrical nut or guide, Fig. 7 being a side sectional view of the guide in position in the impeller, Fig. 8 being a top view of the guide member, and Fig. 9 being a bottom view.

Figures 10, 11 and 12 are fragmentary views upon an enlarged scale of the combined shaft and side wall and central oblique eccentric bearing removed from the assembly, Fig. 10 being a side view, Fig. 11 being a top view in the direction indicated by the arrow 11 in Fig. 10, and Fig. 12, being a side sectional view along the line 12—12 of Fig. 10.

Figures 13 and 14 are top views of the impeller showing its varying positions in respect to the guide and the separating wall, Fig. 13 being on a relatively enlarged scale, the external casing being removed in both figures.

Figures 15, 16 and 17 are side views on a relatively small scale of the various different casing constructions illustrating how the position of the inlet and outlet ports may be varied.

The spherical machine, or fluid actuating device as shown in Figs. 1 and 2, is provided with a casing A, a laterally oscillating impeller B and a main drive shaft D. With the drive shaft rotates the side walls E, and the central ball element F provided with the oblique slot G. Fluid is fed into and removed from the interior chamber of the casing A by the ports H and I. The impeller B is transversely slotted to receive the separating wall J, which separating wall J also receives and guides the cylindrical slotted guide K.

The casing A as shown in Fig. 3, and also in Figs. 1 and 2, may be formed of two sections 30 and 31, which are provided with the flanges 32 and 33. The lower casing section 31 is provided with the feet 35 to enable its support and attachment to a suitable supporting structure. The sides of the casing are provided with the tubular projections 36 and 37 to receive the shaft D.

The upper portions of the inlet and outlet connections H and I (see Fig. 2) pass through the tubular members 38 in the form of cylindrical bores 40. The members 38 extend upwardly from the upper section 30 of the casing A.

When these bores 40 enter the interior of the casing A at the lines 41 (see particularly Figs. 2 and 3) they are widened laterally as indicated at 42, and extend downwardly along the interior sides 43 of the casing A along the peripheral spherical surface 46 if continued (see Fig. 5) until they terminate at the line 44 somewhat short of the bottom of the upper section 30.

These ports or antechambers 40 intersect the spherical surface 46 as inverted trapezoidal shaped openings 47 which depend and converge downwardly along the continuous peripheral spherical wall 46 of the interior chamber of the casing A. These trapezoidal port openings provide a large outlet and inlet flow area over a large portion of the periphery of the impeller B, as indicated in Figs. 1 and 2.

Preferably, the size of these trapezoidal port openings is so controlled that there will be a substantial overlap by the peripheral surface of the impeller B and the edge of the port opening when the impeller is in its extreme oblique positions, the auxiliary relief ports to be described in connection with Figs. 13 and 14 serving to permit entrance or exit of any liquid or fluid which may be trapped by reason of this overlap.

The arms 38 of the upper sections 30 are joined by the downward projection 52 which is connected to the side walls 61 (see Figs. 1 and 3) by the portions 62 of the casing A. The projection 52 is provided with a central bore 53 forming a mount for the structural element carrying the separating wall J.

The mount for the separating wall J (see Figs. 1 and 2) is provided with a central bolt mount 56 which fits into the bore 53 of the depending member 52 of the casing A. The bolt has a threaded portion 54 projecting above the bore 53 which receives a cap 64. This cap 64 may be tightened against the gasket 57 to hold the bolt 56 firmly in position.

The separating wall member J is provided with a body element 58 (see Figs. 1 and 2), the upper surface 59 of which abuts the lower surface 55 of the downward projection 52 and the edge portions thereof at 60 are conformed to the walls 62.

The arrangement of the port intersections 41 is such that the impeller B during its oscillating movement laterally across the interior chamber of the casing A will receive fluid or liquid and will discharge the same with a minimum of disturbance of the flow of the liquid so that the spaces opened within the casing A by the lateral oscillation of the impeller or piston B will be substantially immediately filled with liquid or fluid without wire-drawing or restriction, and in a streamline fashion along the side of the impeller.

The impeller or piston B is actuated by the rotation of the shaft B to oscillate between the side walls by the oblique groove G formed in the ball F.

The side walls E and oblique driving slot G may be formed in separate units adjustably joined together and to the sections 70 and 71 of the main shaft D (as shown in Figs. 10 and 11) and they may be made in one piece, as shown.

Referring to Figs. 10 and 11 the side wall members are formed with an external flat bearing surface 72 and with a peripheral spherical surface 73.

Referring to Figs. 1 and 3, the surfaces 73 of the side walls E conform to, are in close juxtaposition in respect to, and slightly spaced from the periphery 74 of the spherical peripheral surface 46, while the flat surfaces 72 transverse to the axis 75 bear upon the faces 76 of the thrust bearing structures 77.

The conical surfaces 78 (see Figs. 1, 10 and 11) of the side walls E form the lateral limits or side surfaces of the interior pumping chamber and interior rotating compartments formed by the impeller B. The two side surfaces 78 terminate at the line 79 where they connect with the center spherical surface 80 of the ball element F.

The central portion of the ball element F obliquely receives the annular wedge-shaped slot G having the converging conical side surfaces 81 and the central cylindrical surface 82. It will be noted that the axes of the slot G and of the central cylindrical surface 82 coincide and are oblique to the axis 75 of the shaft D. The angle 84 (see Fig. 7) between the axis 75 and 83 will determine the angle of oscillation of the impeller B. The conical surfaces 78 are provided at diametrically opposite places with the recesses 85 which conform to the side surfaces of the impeller B.

The impeller B is shown in assembly in Figs. 1 and 12 and removed from the casing in Figs. 4, 5 and 6.

The impeller B is preferably formed of two semicircular sections 95 and 96 which are oppositely held together along the diameter 94 by the bolts 97, one being provided on each side of the impeller. The lower section 96 is provided with a tapped bore 98 in the shoulder 93 to receive the threaded portion 99 of the bolt 97.

The upper section is provided with a bore 109 in the shelf 92 to receive the shank 101 of the bolt 97 and also with a recess 102 to receive the head 105 of the bolt 97. The washer 104 is abutted against the shelf 92 by the head 105 of the bolt 97.

The central axis 106 of the bolt 97 extends through the bores 40 of the port connections H and I so that they may be readily reached with a tool from the outside of the casing.

It will be noted that portions of the head 105 extend beyond the peripheral wall 107 of the impeller as indicated particularly at 108 in Fig. 10, but this extension does not interfere with the operation of the impeller since throughout the oscillation it projects within the port connections or antechamber 40. The shouldered connection 91 assures correct location of the halves 95 and 96 in respect to each other.

Referring particularly to Fig. 6, the annular impelling surfaces 109 of the impeller are formed by the outside surfaces of the parallel walls 110 of the impeller, which parallel walls 110 are substantially spaced from each other and enclose the open portion 111. The enclosing wall 112 extends peripherally around the outside of the impeller B, and encloses the space 111.

The space 111 is also enclosed by the inwardly-converging or wedge-shaped annular wall 113 which is annularly recessed at 114 at its converging sides and at 115 at its inside portion to receive the conforming annular bearing strip 116. The inside surface 117 of the annular bearing strip 116 closely contacts with and bears upon the cylindrical surface 82 of the shaft G (see Figs. 10 and 11), while the converging side surfaces 118 closely contact with the side surfaces 81 of the slot G, (see Figs. 10 and 11 also).

The converging annular shell member 116 is preferably of a soft bearing material, while the central ball F against which it bears is preferably of hard metal such as steel.

The peripheral surface 107 of the impeller is of spherical contour to conform to the spherical contour of the peripheral surface 46 of the interior chamber of the casing A. The peripheral surface 107 and the side surfaces 109 are preferably located by the abutment of the bearing surfaces 117 and 116 of the impeller B and 81 and 82 of the eccentric slot C so that there will be a satisfactory space and/or surface sealing and/or packing at all times between said surfaces 107 and 109 and the adjacent surfaces of the casing, with avoidance of contact.

This spacing may be anything between 1/1000 to 5/1000 of an inch depending on the size of the pump or spherical engine and the character of the fluid passing therethrough. The spacing of the side walls 110 of the impeller should be such that there will be sufficient width of peripheral surface 107 to assure a satisfactory lateral dimension to the surface spacing or packing.

The top of the impeller as shown in Figs. 5 and 6 is provided with a transverse slot 125 to receive the separating wall J shown in Figs. 1 and 2 and the cylindrical guide shown best in Figs. 7 to 9.

Referring to Figs. 1 and 2 from the body portion 58 of the separating wall element J project upwardly the studs 126 which are received in the recesses 127 in the extension 62 extending across the upper portion of the casing between the inlet and outlet ports H and I. The engagement between the studs 106 and the recesses 107 serve to locate correctly the separating wall body 58.

Projecting downwardly from the bottom of the body member 58 is the annular fin 128 serving to form the wall J, the edge surfaces 129 of which converge inwardly to contact with the conical surfaces 78 of the side walls E.

The bottom surface 130 of the fin is of spherical contour to conform to the spherical surface 80 of the ball F. The lower inside surface 131 of the body 58 (see particularly Fig. 2) is also of spherical contour constituting a continuation of the spherical surface 46.

The fin 128 (see Figs. 1 and 2) is received in the slot 132 of the guide or sliding nut K (see particularly Figs. 4, 7 and 8) and the side surfaces 133 of said fin 128 contact with and ride against the side surfaces 134 of said slot.

The bottom surface 135 (see Fig. 7) of the slot 132 is of spherical contour and constitutes a continuation of the spherical surface 80 of the ball F. The correspondingly contoured surface 130 of the fin 128 (see Fig. 1) rides over said bottom surface 135. The guide K is of cylindrical contour as appears from Figs. 8 and 9 and is received in the socket 136 formed in the slot 125 of the impeller, as shown in Figs. 4 and 5.

The cylindrical side surface 137 of the slotted guide K closely contacts with the cylindrical interior surface of the socket 136. The top surface 131a (see Figs. 4 and 8) of the slotted guide K also has a spherical contour to conform closely to the corresponding contour 131 (see Fig. 2) of the separating wall element J and it constitutes a continuation of the spherical periphery 107 of the impeller B, although unlike this spherical periphery 107 it contacts with the continuation of the peripheral wall 46 as formed by the spherical surface 131 of the body 58 instead of being spaced therefrom, as is the peripheral spherical surface 107 from the conforming surface 46.

Referring to Fig. 4 of the drawings it will be noted that the space 111 extends only a short distance into the upper portion 95 of the impeller B, the upper portion of which is made substantially solid, as indicated at 139.

This solid portion 139 is provided with a recess 140 to receive a cylindrical insert 141 of the bearing metal (see Fig. 5) the inside cylindrical surface 136 of which contacts with the cylindrical outside surface 137 of the slotted guide K.

As best shown in Fig. 5 the semicylindrical sleeve or bearing metal sections 141 are provided with the wedge attachments 142 to the solid portion 139 of the upper impeller section 95.

Provided in the portion 139 of the upper impeller section 95 in the recess or socket 143 (see Figs. 4, 5 and 7) which receives the tubular projection 144 extending downwardly from the bottom of the slotted guide K. The bearing guidance afforded by the nipple 144 turning in the socket 143 (see Figs. 4 and 7) and the guidance further obtained in the recess 147 by the lower end of the guide 146 (see Figs. 4 and 7) in the impeller assure satisfactory cooperation of the slotted guide K and the impeller B.

The slot 125 beyond the cylindrical socket 136 is provided with the diverging surfaces 148 (see Figs. 4 to 7) which diverge at such an angle to each other as to permit suitable pivotal movement of the impeller B in respect to the fin 128 of the separating wall J (see also Figs. 13 and 14).

Referring to Figs. 1 and 2 when the shaft D rotates the impeller B will be caused to sweep laterally across, in an oblique manner, the trapezoidal openings 41 of the port connections H and I, and the spherical peripheral surface 46 between the rotating side walls E.

The obliquely located impeller B will divide the interior chamber C into two annular spherical wedge-shaped compartments L and M (see Fig. 1) which will extend from the outer surface 80 of the ball F to the peripheral surface 46 of the interior chamber, or to a continuation thereof adjacent the ante-chambers 51 and the triangular recesses 47, and between side walls E and impelling surfaces 109 of the impeller or piston B.

These wedge-shaped compartments L and M are diametrically oppositely disposed with respect to the center point 200, of the spherical pump or machine and they will be rotated around the interior of the casing with the turning of the shaft D.

During this rotation these compartments L and M are successively opened and closed to the inlet and to the outlet ports so that fluid or liquid which is received through said inlet ports will be carried to the outlet port.

As to which will serve as the inlet and which as the outlet port is determined by the direction of rotation of the shaft D.

As the compartments L and M move through the wall J and are divided thereby they successively decrease in volume in communication with the outlet port I and increase in volume in communication with the inlet port E.

The inlet and outlet divisions of each compartment L and M in addition to being separated by the wall J are also separated by the conformation space between the side of the impeller B and the side wall of the chamber E.

By providing a recess or conformation in the side wall E to conform to a relatively large area of the side of the impeller B, the seals will take place over a considerable area and assure a satisfactory separation between said inlet and outlet subdivisions of the compartments L and M.

Referring to Fig. 4, and particularly Figs. 13 and 14, when the space packing between the side of the impeller B and the side walls E tends to move across the ends of the side wall J, a pocket 400 (see particularly Fig. 14) will be formed, the volume of which will be changed at a most rapid rate by the continued movement of the impeller B. To prevent any uneven operation of the pump and to assure ready exit from this, or admittance in respect to this pocket, ports 401 are provided in the side surfaces 109 of the impeller immediately adjacent to the oblique surface 148 at the end of the transverse slot 125. The ports 401 are of trapezoidal shape and they are widest adjacent to the periphery 107 of the impeller and they decrease in width as they approach the axis of the impeller B. The ports 401 are extended by means of the channels 402 into the recess 102, which receives the bolt head 108, as shown in Fig. 4.

This recess 102 is of enlarged area so that it will communicate with the port openings or antechambers 40 throughout oscillation of the impeller. As soon as the space packing between the side of the impeller B and the side wall E has moved from the position of Fig. 14 in accordance with the direction of rotation indicated by the arrow 403 to the position of Fig. 13 where it will be bisected by the central plane of the separating wall J, the port 402 will then be sealed, as indicated upon Fig. 13.

This is desirable since there will be no change in volume at the end of the slot 125 during this portion of the movement of the impeller and it is desired at this point to make a closure of the port as will be accomplished by the movement of the upper edge of the impeller to one of its extreme positions, as shown in Fig. 13.

These ports and connecting conduits 402 may be placed both on the compression and vacuum sides of the impeller, but in most constructions it is satisfactory if they are merely placed upon the compression side to assure ready exit of any liquid about to be compressed in the pockets between the space packing and the separating wall D when space packing is about to pass across the ends of the separating wall J.

It is apparent that the close conformation between the periphery of the impeller B in respect to the interior of the spherical device and between the side of the impeller B and the side walls E will prevent substantial leakage flow and will assure that the compartments L and M will be substantially continuously filled with liquid or fluid through the inlet port H and discharged through the outlet port I.

By forming the propelling surfaces 109 of the impeller parallel as shown in Fig. 6, assurance is had that a substantially non-pulsating discharge will result inasmuch as the parallel faces 109 will sweep out as such fluid per unit of time when they are approaching or departing from the conical side walls E and also whether they are near or removed from their corresponding side walls E.

Referring to Figs. 1 and 3 with the continued operation of the spherical machine shown, the contacting transverse bearing surface 72 of the side walls E and 76 of the adjustable thrust bearing 77 should not be permitted to wear and permit a substantial amount of play between the side walls E and said adjustable thrust bearings.

To accommodate this wear and to assure a close fit at all times between the bearing surfaces 76 and the bearing surfaces 72, the thrust bearings 77 are so formed that they may be readily adjusted without difficulty to assure that the center point of the ball will coincide with the center point of the casing and that the axes of the slot G of the shaft D and the oblique transverse axis of the impeller B will intersect at the center point of said casing.

As best shown in Figs. 1 and 3, the thrust bearings 77 are formed of the annular cylindrical members 171 which are inserted in the openings 172 in the tubular projections 36 and 37 laterally extending from the casing A. The inside circular and vertical faces of the thrust bearing structure 77 are provided with the bearing metal liners 173 and 174, which liners are preferably formed in one piece and keyed to the ring 171, as indicated at 175 and 176.

The ends of the tubular projections 37 and 36 are provided with the flanges 177 and 178 to which are respectively bolted the flange 179 of the tubular extension 180 and the end plate 181 by the bolts 182 where the shaft D terminates in the spherical machine. Where the shaft does not terminate in the spherical machine a tubular extension 180 may also be provided for the tubular projection 36. The end plate 181 and the flange 179 are provided with the recesses 183 adapted to receive the annular shims 184. By removal of the bolts 182 and of the end plate 181 and the tubular member 180, the number of shims 184 may be increased or decreased, assuring a corresponding inward or outward adjustment of the thrust bearing structures 77 to assure that the groove G, the ball F and the side walls E will be correctly positioned within the interior of the casing A.

In Fig. 1 will be noted that the terminal end 78 of the shaft D extends within a recess 185 in the end plate 181 and this recess is closed by the bolted connection 182 of the end plate 181 to the flange 186.

At the other side of the casing A the extension 180 is provided with an inwardly directed annular member 187 within which are positioned a plurality of annular packing members 188 which are pressed closely around the extension 189 of the shaft element 71 by the end member 190. This member 190 is bolted at 191 to the annular flange 192 at the end of the tubular extension 180.

As shown, the tubular extensions 38, see particularly Figs. 1 to 3, extend upwardly and laterally from the casing and are provided with the flanges 193 which enable convenient bolted connection with other conduits.

Referring to the guide member shown in assembly in Figs. 1 and 2 and removed therefrom in Figs. 8 and 9, it has been found desirable to have the center of gravity of this guide member positioned as closely adjacent to the periphery 107 of the impeller B as possible. And to accomplish this the bores 198 are provided, which bores decrease the mass adjacent the lower portion of the guide K and move the center of gravity to the peripheral spherical surface of the guide where it is most satisfactorily placed. By locating the mass of the guide K in this manner the cocking and canting of the guide so as to cause uneven wear on the pivotal bearing in the socket B in the bearing G or along the wall I is prevented.

As a result the principal wear will take place upon the upper and lower surfaces of the nut which are best designed to receive the same, while the cylindrical side surfaces of the nut as well as the side surface of the slot, will perform their main function of correctly guiding the impeller or piston in its oscillating movement.

In respect to the action between the oblique slot G and the impeller B the contact between the cylindrical bearing surface 82 of the slot and the cylindrical interior bearing surfaces 117 of the impeller B assures a correct space packing or seal amounting to several thousandths of an inch between the periphery 107 of the impeller and the spherical surface 46 of the casing A.

The bearing contact between the converging side surface 81 of the slot G and the surfaces 118 will similarly assure a correct amount of space packing between the recesses 85 of the side walls E and the side impelling surfaces 109 of the impeller.

It is desirable that these surfaces be satisfactorily lubricated and it has been found suitable to accomplish this by the provision of grooves extending across the bearing surfaces 117 and 118 in the bearing metal insert in the impeller in a manner which is more fully described in the copending application Serial No. 656,640, filed February 13, 1933, now Patent No. 1,946,344, dated February 6, 1934.

Referring to Figs. 2 and 4 to 6, a series of spaced inwardly converging grooves 200 are provided extending along the bearing surface 118, which grooves terminate in the annular groove 201 at the junction of the cylindrical bearing surface 117 and inwardly projecting bearing surface 118. Connecting the annular grooves 201 are the transverse grooves 202. In operation there will be a relatively higher pressure on one side of the separating wall D than on the other side of the separating wall and as a result the liquid being actuated by the impeller B will be forced from the region of high pressure to the region of low pressure through the grooves 200, 201 and 202.

For example, referring to Fig. 6, if we assume that the shaft D is turning so that the high pressure side will be to the left of the slot 125, while the low pressure side will be to the right of the slot 125, the liquid may enter through the left hand grooves 200, then flow into the annular groove 201, then into the transverse grooves 202 and finally out on the low pressure side of the impeller through the right hand grooves 200 (not shown). This flow of liquid under pressure through the grooves 200, 201 and 202 will assure satisfactory lubrication at all times of the surfaces 117 and 118 and will greatly reduce the wear thereof, eliminating the need of constant adjustment.

Similar arrangements may be made, if desirable, for lubricating the bearing between the bearing surfaces 72 and 76 and for lubricating the bearing surfaces between the shaft sections 70 and 71 and the bearing liners 173.

With other shapes of slots G, as for example where the side walls 81 are parallel to each other instead of being converging, similar lubricating arrangements may be provided.

In operation of the spherical engines of the type herein described, it has been found most satisfactory to make the central cylindrical bearing 82 of as large a diameter, compared to the depth of the slot, as possible.

For example, it has been found most desirable to make the ratio of diameter of the ball F to the diameter of the cylindrical surface 82 substantially less than 3 to 1 and preferably between 2 to 1. With the ratio of dimensions of this character the space packing between the side and peripheral surface of the impeller is most satisfactorily achieved and a very efficient operation of the pump with the minimum of frictional loss is most conveniently attained.

Although the tubular members 38 are shown as extended directly upwardly from the casing A it is understood that they may be connected to the casing in many other ways. One or both of these connections may be connected to the casing parallel to the tubular members 36 and 37. Also, if desired, the projections 38 may be so connected to the antechambers 51 that the liquid will flow through the bore 40 spirally or circularly into the antechambers 51 and from there into the compartments L and M.

Figs. 15, 16 and 17 show upper sections 30 which may be used in lieu of the embodiment shown in Figs. 1, 2 and 3. The upper section 30 of the casing A may be conveniently arranged so that the flanges 103 may be located in any convenient position to cooperate with inlet and outlet conduit arrangements in the particular plant or factory or mechanism in which the fluid actuating device of the present invention may be utilized.

In Figs. 16, 17 and 18 respectively, similarly functioning elements are designated with the same numerals provided respectively with a superior prime, superior 2, and superior 3, as in Figs. 1 to 3.

It is also possible to position the bores 40 so that they oppositely enter the sides of the casing 40 parallel to the shaft in such a manner that each bore 40 will connect with the opposite antechamber 51 from the side from which it connects with the casing. In this instanace, a smooth circular or spiral flow may be obtained between the inlet and outlet port connections H and I and through the rotating compartments L and M.

The spherical machines of the present invention may be provided in other instances with other forms of separating walls, guides and casings. For example, the guide instead of being in the form of a cylindrical member K may take the form of a ball or pin, and/or it may be positioned substantially apart from the fixed separating wall, as shown in copending applications Serial Numbers 673,244 and 673,245. Less desirably, the impeller may also be of diverging shape in application 656,637; 656,641 and 696,944, or of converging shape, as shown in applications 656,637 and 656,639. The spherical machine of the present invention may also be utilized as a vacuum pump with a sealing liquid in the manner shown in application 656,642, or as a gas or vapor compressor with a fin guide supported by a porting disc fitting in the wall of the device, in the manner shown in application 656,638.

Although not preferred, instead of a cylindrical slotted guide, conical or converging guides may be employed as shown in applications 656,637 and 656,641.

It is obvious, of course, that instead of the shaft D rotating and the casing A standing still, the shaft D may be fixed and the casing A may be rotated. The side walls also if desired may be fixed in respect to the casing A but in such case the recesses 85 therein are preferably eliminated and other means of sealing or packing between the side surfaces of the impeller and the side walls of the interior chamber may be employed.

By the expression "parallel spaced surface conformations" or "substantial or extended spatial conformations" utilized in the accompanying specification and claims, is meant the conformation of the side of the impeller with the depression or recess in the side walls at the positions indicated at 85 in Figs. 11 and 12, and of the periphery of the impeller in respect to the interior periphery of the interior pumping chamber indicated in Fig. 1. In the preferred form, as shown upon the drawings, there is a fixed parallel spacing between the conforming encircling surface of the chamber, the tubular surfaces being in adjuxtaposition to each other but at all times being spaced from each other, and devoid of contact with each other. The spaced surface conformations differ from supporting contacts such as are encountered in bearing clearances in which the outer bearing member is of a substantially greater diameter than the inner diameter bearing member, with the result that concentrical converging and diverging spaces will be formed between the inner and outer bearing element, with loading at one side forming a contact along a line and an unloaded opposite side with an open space which gradually decreases in width along a line of contact at the loaded side.

What is claimed is:

1. In combination, a casing having an interior taking the form of a spherical section, said section being provided with a spherical peripheral wall and with side walls, and provided with separated inlet and outlet antechambers extending peripherally along said peripheral wall, an oscillating impeller therein, a shaft having an oblique bearing for said impeller passing into said casing, and a pivotally mounted guide connected to said impeller to prevent said impeller from turning, said impeller forming a plurality of reversely congruent separated chambers in said casing and upon actuation by said shaft serving successively to open and close said chambers to said inlet antechamber and then to the outlet antechamber whereby fluid will be moved through said casing from said inlet antechamber to said outlet antechamber, the sides of said impeller having substantial laterally and radially extending spatial conformations with the side walls of said interior on opposite sides of the center point, the periphery and impelling side surfaces of said impeller being located in close adjuxtaposition to said spherical peripheral wall and said conformations of the side walls but being spaced substantially therefrom to avoid frictional contact, the inlet and outlet antechambers intersecting said spherical peripheral wall in the form of inverted trapezoidal openings controlled by the lateral oscillation of the edge of the impeller between the side walls of the casing, said side walls being relatively movable in respect to the casing, said impeller being provided with auxiliary port means extending from the periphery thereof to the side propelling walls of the impeller, said auxiliary port means providing communication between said chambers and said antechambers when said chambers are about to be cut off from said antechambers by the oscillation of said impeller.

2. In combination, a casing having an interior taking the form of a spherical section, said section being provided with a spherical peripheral wall and with side walls, and provided with elongated separated inlet and outlet antechambers extending peripherally along said peripheral wall, an oscillating impeller disc therein, a shaft having an oblique bearing for said impeller passing into said casing, and a cylindrical guide pivotally mounted in the edge of the impeller to prevent said impeller from turning, the axis of said guide being perpendicular to and intersecting the axis of the shaft, said impeller forming a plurality of reversely congruent separated chambers in said casing and upon actuation by said shaft serving successively to open and close said chambers to said inlet antechamber and then to the outlet antechamber whereby fluid will be moved through said casing from said inlet antechamber to said outlet antechamber, the sides of said disc having substantial spatial conformation depressions in the side walls of said interior on opposite sides of the center point, the periphery and sides of said impeller being located in close adjuxtaposition to said spherical peripheral wall and said side wall conformations, but being spaced substantially therefrom to avoid frictional contact, the inlet and outlet antechambers intersecting said spherical peripheral wall in the form of spherical trapezoids and being controlled by the lateral oscillation of the edges of the impeller between the side walls of the casing, said side walls being connected to the shaft to rotate therewith, said impeller being provided with auxiliary port means to establish communication between said chambers and said antechambers when said chambers are being cut off or opened by the oscillating movement of the impeller disc.

3. In combination, in a spherical machine, a casing having an interior chamber to receive and discharge fluids and an oscillating disc-like impelling piston therein, said interior chamber being provided with side walls and with a peripheral wall and said piston being positioned obliquely within said chamber, said side walls being provided with extended surfaces conforming to substantial areas on the sides of the piston and said peripheral wall being provided with extended port openings, and said impeller being provided with auxiliary port openings extending through said impeller from the fluid impelling side thereof to the periphery thereof.

4. In combination, in a spherical machine, a casing having an interior chamber to receive and discharge fluids and an oscillating disc-like impelling piston therein, said interior chamber being provided with side walls and a peripheral wall and said piston being positioned obliquely within said chamber, said peripheral wall being provided with extended port openings controlled by the periphery of the piston, said piston being provided with auxiliary ported means including a recess positioned to be in communication with one of said port openings and transverse port openings extending from the sides of said recess into the propelling sides of said piston, said recess being positioned on the periphery of that portion of the piston which comes opposite said one port opening.

5. In combination, in a spherical machine, a casing having an interior chamber to receive and discharge fluids and an oscillating disc-like parallel-walled hollow impelling piston therein said interior chamber being provided with side walls and a peripheral wall, and said piston being positioned obliquely within said chamber, said side walls being provided with diametrically opposed surfaces which conform to the side faces of the piston and said peripheral wall being provided with extended inlet and outlet port connections, and said piston being recessed at the portion of its periphery opposite said port connections and bored to form auxiliary port connections in communication with said first-mentioned port connections said bore extending from said recess to the impelling side of said piston.

6. In a spherical apparatus, a casing having an interior chamber, an impelling piston positioned obliquely therein, means to impart an oscillating movement to said piston about a fixed center point, and means including a cylindrical slotted guide engaging said piston to prevent rotation thereof while it is being oscillated by said means, said impeller being provided with a transverse slot and said slot being provided with a cylindrical socket receiving said guide, said means also including a separating wall extending transversely across said chamber at one side thereof and through said slotted guide, said guide bearing both against the walls of said socket and the sides of said separating wall, and port means extending from the side of said piston adjacent said slot to the periphery of said piston adjacent said slot, and serving to permit ready fluid passage to and from the face of the impelling piston adjacent said slot.

7. In a fluid actuator, a spherical enclosure, an impelling piston member with annular fluid impelling side faces extending across said enclosure, rotating side wall members also extending across said enclosure, rotatable oblique holding means to hold said impelling piston member obliquely in respect to said rotating side walls whereby they will diametrically oppositely approach and diverge from each other to form annular-like wedge-shaped fluid receiving and discharging compartments, shaft means rotatably movable and said side wall members being rotatably movable therewith and with said oblique holding means, inlet and outlet connections to and from said enclosure, guide means to prevent rotation of said impelling piston member and in cooperation with the holding means to cause said impelling piston member to undergo a relative lateral and longitudinal oscillating movement in respect to said side walls, and simultaneously with rotation of said side wall members and said oblique holding means and said shaft, whereby said wedge shaped fluid receiving and discharging compartments are rotated into and out of communication with said inlet and outlet connections, a separating wall whereby said outlet and inlet connections are separated from each other and said compartments are each divided into two sub-compartments one of which increases in volume in communication with the inlet connection and the other of which decreases in volume in communication with the outlet connection during the rotation of the compartments, said side wall members being recessed where said piston member most closely approaches them, whereby the impelling side faces of said impelling piston member are depressed below the general surfaces of said side wall members into said recess, said side wall members being positioned in respect to said holding means, so that said depression therein will always be opposite the approaching side faces of said piston member, and said piston member being provided with passage-ways extending from that portion of the impelling side faces thereof, which are completely depressed into said recess, when one compartment is not divided by the separating wall and the other compartment is bisected by the separating wall, to the portion of the periphery of said piston member, which is under one of said connections.

8. In a liquid pump, a spherical casing including a peripheral spherical enclosure, a disc-like transversely slotted impelling piston member extending diametrically across said enclosure with annular propelling faces, rotatable conical side walls extending chordally across and closing the sides of said enclosure, a central rotatable obliquely slotted ball to hold said impelling piston member obliquely in respect to said walls whereby said walls and faces diametrically oppositely approach and diverge from each other to form a plurality of annular-like wedge-shaped fluid receiving and discharging compartments extending laterally between said side walls and propelling faces and radially between said ball and said peripheral enclosure, shaft means to rotate said ball member and said side walls rigidly connected thereto, inlet and outlet ports intersecting said enclosure, guide means in said slot in said piston member to prevent rotation of said piston member and to cause said impelling piston member to undergo a relative oscillating movement laterally in respect to and between said side walls upon rotation of said ball member by said shaft, whereby said wedge-shaped fluid receiving and discharging compartments are rotated into and out of communication with said inlet and outlet connections, said device being also provided with a transverse separating wall extending between said outlet and inlet ports passing through said transverse slot in said piston member and dividing each of said compartments during its rotation into two sub-compartments, one of which increases in volume in communication with the inlet connection and the other of which decreases in volume with the outlet connection during the rotation of the compartments, said annular propelling faces being continuous and uninterrupted except for said slot, said piston member being positioned obliquely within said enclosure so that said propelling faces will be positioned below the normal surface of said conical walls upon convergence therewith and said conical side walls being continuous except for a depression formed therein, into which the extension of said annular propelling faces extends, said piston member being provided with a passage-way therethrough extending from an annular propelling face at a position closely adjacent to said slot to the portion of the periphery thereof under the adjacent one of said ports.

9. In combination, in a spherical machine, a casing having an interior chamber to receive and discharge fluids and an oscillating impelling piston therein with a periphery and annular fluid actuating side faces, said interior chamber being provided with side walls and with a spherical peripheral wall and said piston being positioned obliquely within said chamber with its periphery conforming to said spherical peripheral wall, said peripheral wall being provided with extended inlet and outlet port openings, and said impeller being provided with auxiliary port openings, said auxiliary port openings extending through the piston from the annular side faces thereof to the periphery thereof and serving to relieve fluid pressure or vacuum created in said interior chamber by oscillation of said piston.

10. In combination, in a spherical machine, a casing having an interior chamber to receive and discharge fluids and an oscillating impelling piston therein with a periphery and annular fluid actuating side faces, said interior chamber being provided with side walls and with a spherical peripheral wall and said piston being positioned obliquely within said chamber with its periphery conforming to said spherical peripheral wall, said peripheral wall being provided with extended inlet and outlet port openings, and said impeller being provided with auxiliary port openings, said auxiliary port openings extending through the portion of said piston positioned under one of said first-mentioned port openings from the periphery thereof to the actuating side faces thereof.

11. In combination, in a spherical machine, a casing having an interior chamber to receive and discharge fluids and an oscillating impelling piston therein with a periphery and annular fluid actuating side faces, said interior chamber being provided with side walls and with a spherical peripheral wall and said piston being positioned obliquely within said chamber with its periphery conforming to said spherical peripheral wall, said peripheral wall being provided with extended inlet and outlet port openings, and said impeller being provided with auxiliary port openings, said piston being provided with a central ball element rotatable relatively to said piston to cause oscillating movement thereof, said central ball element being provided with bearings to support the same during the rotary movement and said bearings being provided with lubricating grooves to supply lubricant thereto and said auxiliary ports also being substantially removed from said bearing surface and said ball and extending through said impeller from the periphery thereof to the fluid actuating side faces thereof.

FRANK A. PESCHL.